Oct. 23, 1945.  J. A. COOK  2,387,645
GAUGING APPARATUS
Filed Jan. 5, 1944
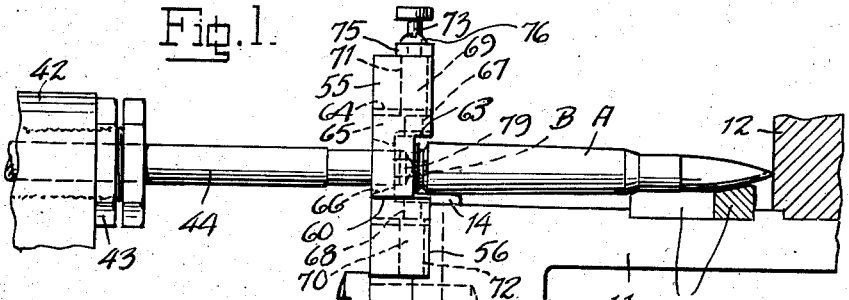
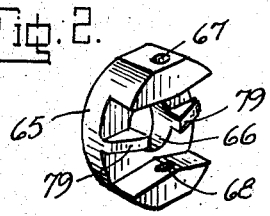
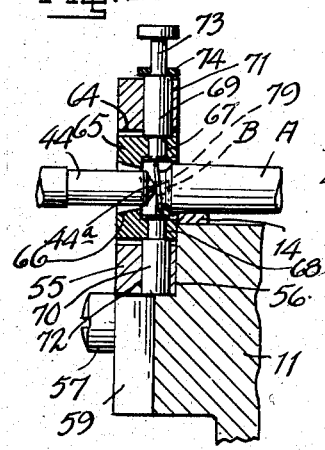
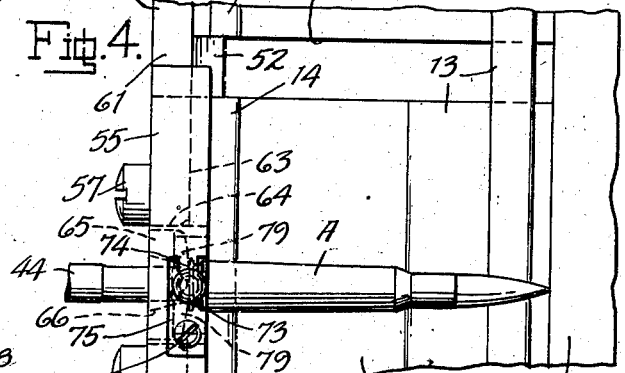
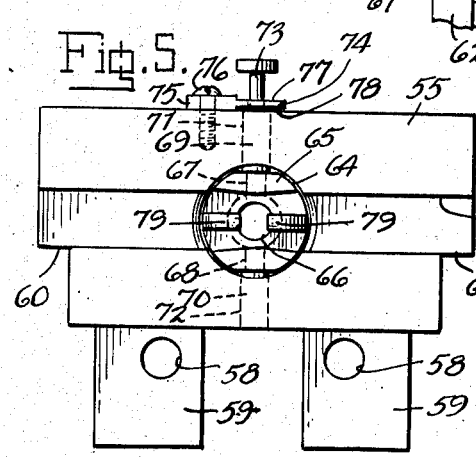
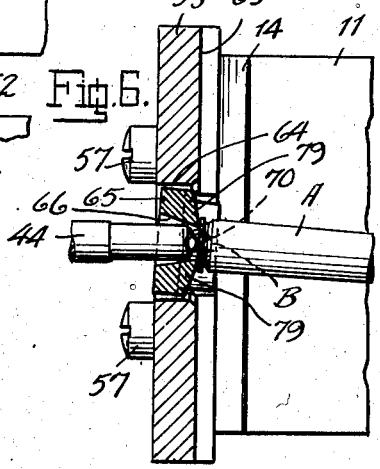
INVENTOR
JUDSON A. COOK
BY
ATTORNEYS Patented Oct. 23, 1945

2,387,645

UNITED STATES PATENT OFFICE 2,387,645

GAUGING APPARATUS

Judson A. Cook, Bridgeport, Conn., assignor to Remington Arms Company, Inc., Bridgeport, Conn., a corporation of Delaware Application January 5, 1944, Serial No. 517,047

3 Claims. (Cl. 33—174)

The present invention relates to an improvement in gauging apparatus, and while the apparatus may be used in gauging operations in connection with various types of articles, as will be obvious from the following disclosure, the illustrated form of the invention is especially adapted for the gauging of cartridges, particularly the inspection gauging for primer depth. The depth of the primer in the primer pocket of a cartridge must be extremely accurate as a slightly high primer may impede the automatic feeding of the cartridge in the gun and a slightly low primer may fail to fire. Hence, the allowable tolerance in the height position of the primer is very small, and any shifting from normal of the central gauge contacting point of the primer, such as might be caused by a crooked head, or by slight tilting misalignment of the cartridge in the gauging machine, will result in inaccurate gauging, with the possibility that a great many cartridges that should pass the gauging test will be automatically rejected, while imperfect cartridges will be passed as perfect.

The present gauging apparatus is especially adapted for use in an automatic gauging machine of the type disclosed in the patent to Z. P. Candee, for Gauging mechanism, 1,783,404, granted December 2, 1930. In the mechanism disclosed in this patent the cartridge primer depth gauging operation is predicated on the theory that all cartridge heads are in perfect axial alignment with the gauging rod as they pass through the primer depth gauge station. In this mechanism the gauging rod operates through a rigid main plate and is guided by a rigid face plate, which makes no allowance for misalignment of the cartridge heads; hence, if a head is crooked or is tilted into slightly misaligned position, it will fulcrum about the peripheral edge of the head of the cartridge case, causing the center of the primer to move away from the face plate, with the result that the gauging rod in gauging contact with the center of the primer will gauge the primer as low, whereas it may in fact be high or perfect.

It is an object of the present invention to provide a gauging apparatus wherein a rockable abutment member is provided for contact with the cartridge case head, and through which the gauging rod is guided, the abutment member being rockable about a vertical central axis coincident with the center of the primer end. Thus, any tilting misalignment of the cartridge case will fulcrum about the central point of the primer, while the periphery moves inwardly at one side and outwardly at the other side, thus maintaining the central gauging rod contact point at a fixed point with respect to the gauging station irrespective of misalignment of the cartridge case.

With the above and other objects in view, an embodiment of the invention is shown in the accompanying drawing, and this embodiment will be hereinafter more fully described with reference thereto, and the invention will be finally pointed out in the claims.

In the drawing:

Fig. 1 is an enlarged side elevation of the gauging apparatus of the invention, showing a cartridge in cooperative relation therewith.

Fig. 2 is a perspective view of the rockable abutment member.

Fig. 3 is a vertical longitudinal sectional view of the gauging apparatus.

Fig. 4 is a top plan view.

Fig. 5 is a front elevation, detached from the gauging machine.

Fig. 6 is a horizontal sectional plan view, showing the cartridge in cooperative relation therewith, and in a laterally tilted misaligned position.

Similar reference characters indicate corresponding parts throughout the several figures of the drawing.

The gauging machine referred to in the patent to Candee, No. 1,783,404, is an example of the type of machine in which the gauging apparatus of the invention is especially adapted to be incorporated. Such a machine automatically gauges or inspects the articles guided therethrough, and usually includes a series of successively arranged gauging or inspection stations for performing various gauging operations, each station including automatic ejection means whereby the articles failing to meet the gauging standard are ejected, so that they are segregated into groups, one for each gauging test. In the operation of such a machine, the articles are guided from a dial or other mechanism and conducted by any convenient mechanism to the successive stations where they are automatically gauged. If these successive gaugings are within the allowable tolerances the articles are discharged from the machine into a conveniently arranged receptacle. The gauging apparatus of the present invention is concerned with the gauging operation of determining the primer depth of a cartridge, that is, whether the primer is inserted in the primer pocket to the proper depth, or is high or low. This gauging operation is essentially a depth gauging operation along the central axial line of the cartridge case, the point of the bullet being pressed against a fixed abutment and the gauging rod being brought into contact with the center of the primer. While the apparatus is especially adapted for the gauging of cartridge cases, it will be obvious that the invention may be employed for other analogous gauging operations and for other types of articles.

The gauging machine consists generally of a bed plate having fixed thereon a longitudinally extending table 11 provided with an abutment guide bar 12 against which the bullet ends of the cartridges are engaged and one or more track guide bars 13 and 14 upon which the cartridges roll to and between the several inspection stations.

A reciprocating head member 42 having a threaded sleeve 43 is provided for slidably guiding the reciprocable gauging rod 44. Movement of the rod beyond a predetermined point when the reciprocating head is in its gauging position serves to operate the gauging apparatus as described in the aforementioned Candee patent.

Upon the inner side of the table 11 there is mounted a vertically disposed plate 55, set into an angular recess 56 in the table and secured thereto by means of screws 57 engaged through holes 58 in a pair of downwardly projecting spaced attaching portions 59—59. The plate is angularly recessed at each end, as at 60, to receive the upper supporting end of the ejection gate 52 disposed within the gap at the upper end of chute 51. The plate projects above the upper side of the table 11 and is extended at each end to meet the ends 61 of the fixed guides 62 of the adjacent gauging stations substantially centrally of the ejection chute 51, these fixed guides forming abutment supports for the head ends of the cartridges as they are fed along the track guide bars 13 and 14.

The plate is provided with a longitudinal guide channel 63 in which the head ends of the cartridges are fed, and centrally of this channel is provided with a transverse cylindrical opening 64 in axial alignment with the gauging rod 44, and within which the cartridge abutment or anvil member 65 is rockably supported.

The rockable anvil member is in the form of a C-shape anvil provided in its upright portion with a tapered hole 66 through which the rounded point-contact button end 44ª of the gauging rod 44 is adapted to be engaged to contact the primer B of the cartridge case A, and provided in its upper and lower end portions with bearing holes 67 and 68, engaged by the trunnion pins 69 and 70 set in holes 71 and 72 in the plate 55. The trunnion pins are arranged for rockably supporting the anvil member for free turning movement about a vertical axis coincident to the plane of the vertical wall of the guide channel 63, and consequently upon an axis calculated as essentially coincident with the plane of the center of the end surface of the primer in the head of the cartridge.

The pin 69 is provided with an upwardly projecting stem portion 73 engaged by the forked end 74 of a positioning plate 75 secured upon the upper side of the plate 55 by means of a screw 76. This plate positions the pin against outward movement and may be filed away at its upper and lower sides, as at 77 and 78, to establish a proper fitting relation of the pin with the rockable anvil member, this relation being preferably such that the anvil member has free rocking movement without looseness.

Upon the upright portion of the anvil member at each side of the tapered gauging rod hole 66 there are provided projecting anvil support portions 79—79 in a plane at right angles to the vertical turning axis of the anvil member, and straddling the hole 66 at each side of the button end of the gauging rod engaged therethrough. These anvil support portions are preferably inclined and rounded at their outer surfaces to provide point or line contacts in a plane coincident to the turning axis for supporting engagement with a cartridge head at each side of the primer.

In operation the cartridge A is fed into the gauging station in axial line with the rockable anvil member 65 and the gauging rod, its head end being in contact at each side of the primer B with the anvil support portions 79 and its point end being in engagement with the abutment guide bar 12. The gauging rod moves into contact with the center of the primer B of the cartridge through the inward movement of the slide 18, and if the height of the primer is within the allowable tolerances the gauging rod 44 remains in a substantially centralized position, so that the trip mechanism for operating the release gate 52 will not be actuated. In the event that the primer is either high or low, movement will be imparted to the gauging rod 44 to cause relative movement to actuate the trip mechanism causing the gate 52 to open, so that as the cartridge is fed into the gauging station during the succeeding feed movement its head end will be unsupported by the gate as it comes into register with the slot opening of the chute 51, and such rejected cartridge will drop down through the chute to a suitable receptacle.

In the event that the cartridge head, as the cartridge is brought into relation with the gauging station, is in a misaligned position, due either to a crooked head, as illustrated in Fig. 3, or to angular disposition of the cartridge in the machine, as illustrated in Fig. 6, the tilted position of the head will cause the anvil member 65 to rock into tilted position within the opening 64 in correspondence therewith, the tilting taking place about its vertical supporting axis in exact coincidence with the center of the primer B of the cartridge. Hence, the misalignment of the cartridge head will not change the position of the center of the primer where the end of the gauging rod contacts it, with the result that an accurate gauging takes place irrespective of the tilted position or the degree of tilt.

In Fig. 3 a condition is illustrated where the head of the cartridge is crooked and disposed in a plane inclined to the vertical rocking axis of the anvil member. In this case the support provided by the anvil support portions 79 permits this disposition of the head, and if the crookedness of the head is also relative to a horizontal line, the anvil member will rock to correspond to it. In Fig. 4 the condition is shown where the cartridge is misaligned, throwing the head into a tilted position, the anvil member rocking to coincide with it. In the case of a cartridge having a crooked head, the anvil may assume a position similar to that shown in Fig. 6, while the body of the cartridge remains in axial alignment with the gauging rod.

It is pointed out that with machines heretofore in use a crooked head, or a tilted head, disposed in relation to a fixed supporting plate would engage the plate at the periphery of the head, causing the center point of the primer to be outwardly spaced from the normal gauging point. Consequently the gauging rod would project to an increased extent to engage the primer with the result that the gauging would be inaccurate.

The form of the invention illustrated in the drawing and described herein is typical and illustrative only, and it is evident that the invention is capable of embodiments in other forms, all falling within the scope of the appended claims, which are to be broadly construed.

What is claimed is:

1. In a gauging apparatus, a mount having a transverse opening therethrough; anvil means having a transverse gauging opening, said anvil means having a supporting surface for engaging a part of an article to be gauged; and spaced pivot means carried by said mount and engaging said anvil means, said anvil being rotatable on said pivot means in accordance with the alignment of said article, the axis of said pivot means being located to pass through a predetermined gauging point in line with said supporting surface, thereby maintaining said point at a predetermined position.

2. In a gauging apparatus, a mount; anvil means for supporting a surface of an article to be gauged; pivot means carried by said mount and engaging said anvil means, said anvil being movable on said pivot means in accordance with the position of a supported article; and a pair of contacting surfaces on said anvil for engaging said article, said surfaces being on opposed sides of the axis passing through said pivot means and in a line intersecting said axis line at right angles, said intersection being at a predetermined gauging point so as to maintain said gauging point at a predetermined position.

3. In a gauging apparatus, a mount having a transverse opening therethrough; article supporting anvil means having a transverse gauging opening; spaced pivot means carried by said mount and engaging said anvil means, said anvil being rotatable on said pivots in accordance with the position of a supported article; and a pair of lonigtudinally extending restricted contact surfaces located either side of the transverse opening of said anvil, said surfaces being on opposed sides of the axis passing through said pivot means and in a line intersecting said axis line at right angles, said intersection being at a predetermined gauging point so as to maintain said gauging point at a predetermined position.

JUDSON A. COOK.